United States Patent
Sohn et al.

(10) Patent No.: US 8,199,738 B2
(45) Date of Patent: Jun. 12, 2012

(54) APPARATUS AND METHOD FOR PROCESSING RANGING CHANNEL OF COMMUNICATION SYSTEM

(75) Inventors: Kyung-Yeol Sohn, Daejeon (KR); Hyeong-Sook Park, Daejeon (KR); Youn-Ok Park, Daejeon (KR)

(73) Assignees: Samsung Electronics Co., Ltd (KR); Electronics and Telecommunications Research Institute (KR); KT Corporation (KR); SK Telecom Co., Ltd (KR); Hanaro Telecom., Inc. (KR)

( * ) Notice: Subject to any disclaimer, the term of this patent is extended or adjusted under 35 U.S.C. 154(b) by 1357 days.

(21) Appl. No.: 11/636,814

(22) Filed: Dec. 11, 2006

(65) Prior Publication Data

US 2007/0133460 A1    Jun. 14, 2007

(30) Foreign Application Priority Data

Dec. 9, 2005   (KR) .................. 10-2005-0120842

(51) Int. Cl.
H04J 1/00         (2006.01)

(52) U.S. Cl. ........ 370/343; 370/208; 370/210; 370/344; 375/259; 375/260; 455/509

(58) Field of Classification Search .............. 370/343, 370/344, 208, 310; 455/509; 375/259, 260
See application file for complete search history.

(56) References Cited

U.S. PATENT DOCUMENTS

| 6,636,559 | B1* | 10/2003 | Kakura | 375/150 |
|---|---|---|---|---|
| 7,512,184 | B2* | 3/2009 | Suzuki | 375/260 |
| 7,656,844 | B2* | 2/2010 | Hayashi | 370/335 |
| 2004/0141457 | A1* | 7/2004 | Seo et al. | 370/203 |
| 2005/0135230 | A1* | 6/2005 | Yu et al. | 370/210 |
| 2005/0141474 | A1 | 6/2005 | Lee et al. | |
| 2005/0163238 | A1* | 7/2005 | Fujii | 375/260 |
| 2007/0060180 | A1* | 3/2007 | Muharemovic et al. | 455/509 |

FOREIGN PATENT DOCUMENTS

| KR | 10-2005-0023459 | 3/2005 |
|---|---|---|
| KR | 1020050089709 | 9/2005 |
| KR | 100521133 | 10/2005 |

OTHER PUBLICATIONS

Meng-Han Hsieh et al., A Frequency Acquisition Scheme for OFDM Systems, 1996.

* cited by examiner

*Primary Examiner* — Rafael Pérez-Gutiérrez
*Assistant Examiner* — Liton Miah
(74) *Attorney, Agent, or Firm* — The Farrell Law Firm, P.C.

(57) ABSTRACT

Disclosed herein is a base station that extracts a ranging channel signal from a received signal partially correlates each of a plurality of ranging channel signals and each of ranging codes according to ranging modes, and selects a ranging channel signal greater than a first threshold value, the plurality of ranging channel signals being signals according to plurality of time delays of a ranging channel signal. In addition, the base station correlates each of the selected ranging channel signal and each of corresponding ranging code, selects a ranging channel signal having the maximum correlation value, and estimates receiving power by using a time delay corresponding to the selected ranging channel signal.

13 Claims, 3 Drawing Sheets

APPARATUS AND METHOD FOR PROCESSING RANGING CHANNEL OF COMMUNICATION SYSTEM

This application claims priority to Korean Patent Application No. 10-2005-0120842, which was filed in the Korean Intellectual Property Office on Dec. 9, 2005, the entire contents of which are incorporated herein by reference.

BACKGROUND OF THE INVENTION

1. Field of the Invention

The present invention relates to a ranging channel processing apparatus of a communication system and a method thereof.

2. Description of the Related Art

Among communication systems, an Orthogonal Frequency Division Multiple Access (OFDMA) communication system is a multi-user access based system that allocate subchannels formed by a set of subcarriers to each User Equipment (UE) and thus the OFDMA-based system uses more subcarriers that a conventional OFDM system (e.g., IEEE 802.11a) does.

When a base station of the OFDMA system transmits signals to a plurality of mobile stations (i.e. during downlink), the signals are simultaneously transmitted through subchannels allocated to the respective mobile stations with time synchronization. Accordingly, orthogonality between signals can be guaranteed. However, when the plurality of the mobile stations transmit signals to the base station (i.e. during uplink), each of the plurality of mobile stations may have an individual time and location, and, therefore, signals transmitted from the plurality of mobile stations respectively arrive at the base station with different time delay and different transmitting power from each other. Particularly, a transmission signal of a mobile station that exceeds an allowable protection range of the base station causes orthogonality loss of a received signal, thereby resulting in a severe signal loss, and, therefore, the OFDMA system allocates a subcarrier group to a predefined ranging channel and the base station estimates a transmission delay and receiving power of each of the mobile stations by using ranging channels transmitted from the respective mobile stations.

For example, an Institute of Electrical and Electronics Engineers (IEEE) 802.16a/802.16e communication system defines four ranging modes. According to the ranging purpose, the ranging mode includes an initial ranging, a periodic ranging, a handover ranging, and a bandwidth-request ranging. The bandwidth-request ranging is used by a mobile station for requesting bandwidth allocation from a base station, and other ranging modes are used for uplink synchronization acquisition and power control between a mobile station and a base station.

A plurality of mobile stations are simultaneously allowed to transmit ranging channel signals, and each mobile station uses a ranging mode according to its purpose. For example, assume that "A" ranging codes are allocated for initial ranging, "B" ranging codes are allocated for periodic ranging, "C" ranging codes are allocated for handover ranging, and "D" ranging codes are allocated for bandwidth-request ranging. In this assumption, the ranging codes are respectively transmitted to the plurality of mobile stations through a DL_MAP message, and the mobile stations perform ranging by using appropriate ranging codes included in the DL_MAP message for the ranging mode.

A conventional transmitting apparatus of a mobile station and a conventional receiving apparatus of a base station, which use such a ranging method will be described.

Mobile stations trying to access the base station randomly select a ranging code among predetermined available ranging codes, modulate a signal by using a subcarrier group allocated to a ranging channel, transform a frequency domain signal into a time domain signal by using an Inverse Fast Fourier Transform (IFFT), and add a guard interval to the time domain signal so as to reduce inter-symbol interference. The mobile stations then transmit the time domain signal through a radio channel.

The base station receives signals having different time delays from the mobile stations, eliminates the guard interval added to the received signal, transforms the time domain signal into a frequency domain signal by using FFT, and correlates a ranging channel signal obtained by performing the FFT on the time domain signal with a base station ranging code, and estimates a time delay and receiving power.

Since the base station does not know which ranging mode is used to perform a ranging process by each of the mobile stations, the base station therefore arranges ranging codes used for the respective ranging modes in parallel for correlation corresponding to a ranging length (N) for each ranging code. However, such a correlation process must be repeated with respect to all time delays that can be searched, causing the size of hardware to increase and the amount of computations to increase. Accordingly, too much time is required to estimate transmission delay and receiving power of a mobile station increases, thereby decreasing efficiency.

The above information disclosed in this Background section is provided to enhance the understanding of the invention and contain information that was not necessarily known to a person of ordinary skill in the art.

SUMMARY OF THE INVENTION

The present invention has been made in an effort to provide a ranging channel processing method having advantages of reducing time for estimating receiving power of a mobile station in a communication system, and an apparatus using the same.

An apparatus according to the present invention processes a ranging channel signal from a signal received by a base station in a communication system. The apparatus includes a ranging code generator, a ranging channel signal extractor, a first selector, a second selector, and an estimator. The ranging code generator generates a plurality of ranging codes according to ranging modes. The ranging channel signal extractor extracts at least one first ranging channel signal from the received signal. The first selector partially correlates each of second ranging channel signals with each of the ranging codes to select at least one second ranging channel signal. The at least one second ranging channel signal has a correlation value that is greater than a first threshold. The second ranging channel signals are signals according to a plurality of time delays of the at least one first ranging signal.

According to the present invention processes a ranging channel signal from a signal received by a base station in a communication system. The method includes extracting a first ranging channel signal from the received signal; partially correlating each of second ranging channel signals with each of ranging codes according to ranging modes to select a second ranging channel signal having a correlation value that is greater than a first threshold value. The second ranging channel signals are signals according to a plurality of time delays of the first ranging channel signal.

An apparatus according to the present invention processes a ranging channel signal received by a base station in a communication system. The apparatus includes a means for generating a plurality of ranging codes according to a ranging mode and a means for selecting at least one second ranging channel signal from a plurality of first ranging channel signals by using the plurality of ranging codes. Herein, the plurality of first ranging channel signals are signals according to a plurality of time delays.

The apparatus further includes a means for selecting a third ranging channel signal from the at least one second ranging channel signal by using a ranging code corresponding to the at least one second ranging channel signal among the plurality of ranging codes, and a means for estimating receiving power by using a time delay of the third ranging channel signal.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
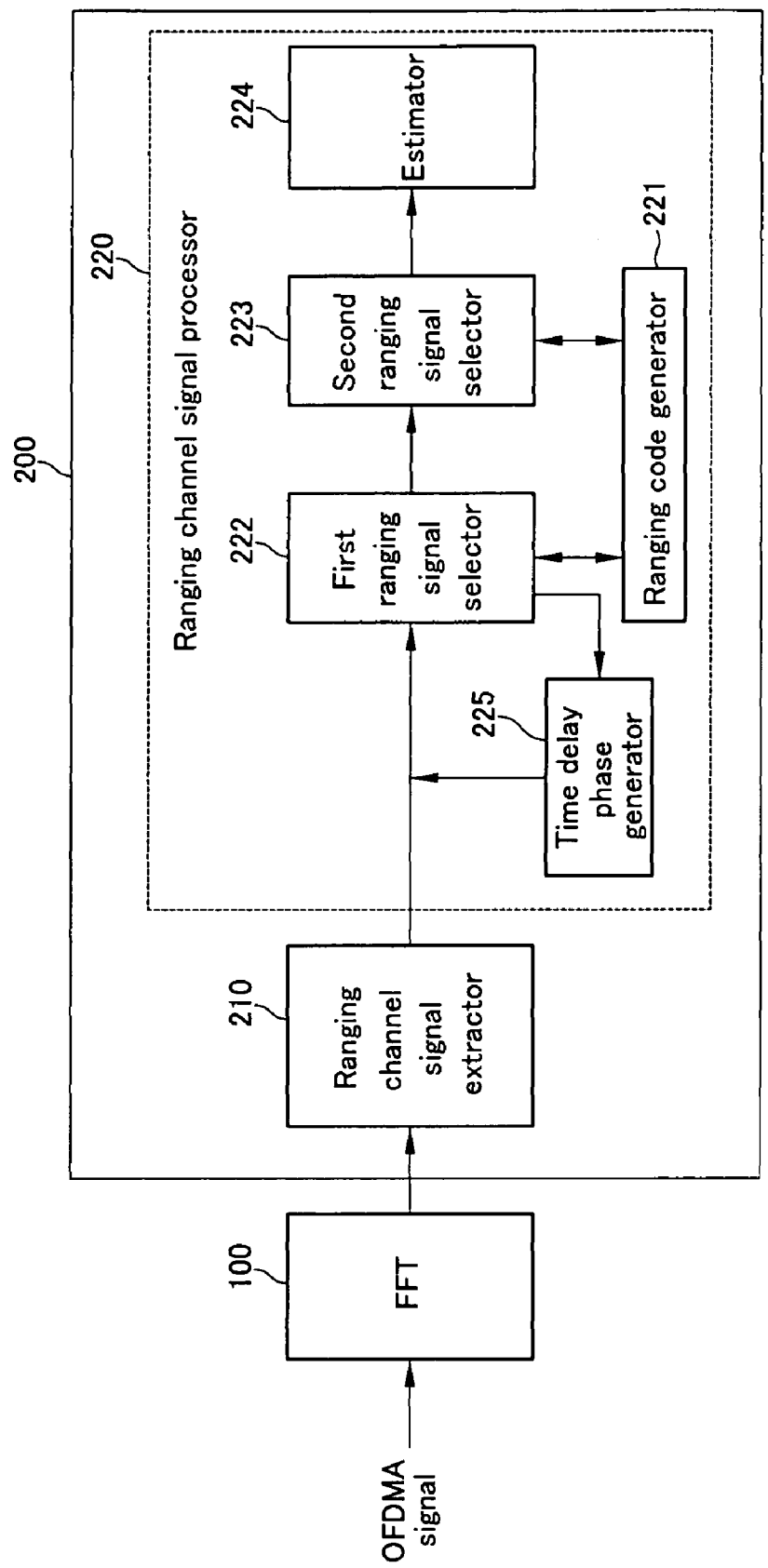
FIG. 1 is a block diagram of a receiving apparatus including a ranging channel processing apparatus in an OFDMA system according to an exemplary embodiment of the present invention.

Preferred embodiments of the present invention will be described in detail herein below with reference to the accompanying drawings. The following description includes information necessary to understand an operation of the present invention, omitting unnecessary description for the sake of clarity and conciseness.

In the following detailed description, preferred embodiments of the present invention are shown and described. As those skilled in the art would realize, the described embodiments may be modified in various different ways, without departing from the spirit or scope of the present invention. Accordingly, the drawings and description are to be regarded as illustrative in nature and not restrictive. Like reference numerals designate like elements throughout the specification.

A ranging channel processing apparatus of a communication system and a method thereof according to an exemplary embodiment of the present invention are described in detail with reference to the accompanying drawings. According to the present invention, the ranging channel processing apparatus and the method thereof are applied to the OFDMA communication, and the invention can be applied to other communication systems.

FIG. 1 is a block diagram showing a receiving apparatus including the ranging channel processing apparatus in the communication system according to the exemplary embodiment of the present invention. As shown in FIG. 1, a receiving apparatus of the communication system includes a Fast Fourier transform (FFT) unit 100 and a ranging channel processing apparatus 200. The FFT unit 100 transforms a time domain signal transmitted from a mobile station into a frequency domain signal (e.g., an OFDMA signal). The ranging channel processing apparatus 200 includes a ranging channel signal extractor 210 and a ranging channel signal processor 220.

The ranging channel signal extractor 210 extracts ranging channel signals of a subcarrier group allocated to a ranging channel from the frequency domain signal transformed by the FFT unit 100. In general, a channel is formed of a plurality of subchannels, each formed of a plurality of subcarriers, and a pair of more than one neighboring subchannel is used as a ranging channel. Therefore, the ranging channel signal extractor 210 extracts signals (hereinafter referred to as a "ranging channel signal") that correspond to a ranging channel among the signals output from the FFT unit 100.

The ranging channel signal processor 220 includes a ranging code generator 221, a first ranging signal selector 222, a second ranging signal selector 223, an estimator 224, and a time delay phase generator 225.

The ranging code generator 221 generates ranging codes according to a plurality of ranging modes used in a base station. For example, an IEEE 802.16a/802.16e-based communication system includes an initial ranging mode, a periodic ranging mode, a handover ranging mode, and a bandwidth-request ranging mode.

The time delay phase generator 225 sequentially generates phases respectively corresponding to all time delays that can be searched by the base station.

The first ranging signal selector 222 selects a first ranging channel signal from the ranging channel signals according to all the time delays that can be searched by the base station. In further detail, the first ranging signal selector 222 performs M-length partial correlations between each of the ranging channel signals and the ranging codes, compares the correlation values with a first threshold value, and selects first ranging channel signals. The first ranging channel signals are the ranging channel signals having a correlation value greater than the first threshold value.

The first ranging signal selector 222 transmits the first ranging channel signal to the second ranging signal selector 223. Herein, the M-length is shorter than a ranging code length (hereinafter N-length). In this case, the first ranging signal selector 222 transmits a ranging code of the first ranging channel signal having the correlation value greater than the first threshold value and the corresponding time information to the ranging code generator 221.

The second ranging signal selector 223 selects a second ranging channel signal from the first ranging channel signals selected by the first ranging signal selector 222. In further detail, the second ranging signal selector 223 performs a ranging code length (i.e., N-length) correlation between the each ranging code and the first ranging channel signals corresponding to each ranging code, and selects second ranging channel signals. Each of the second ranging channel signals is the first ranging channel signal having the maximum correlation value in the corresponding ranging code.

The estimator 224 estimates receiving power using a time delay that corresponds to the second ranging channel signals selected by the second ranging signal selector 223.

Figure 2:
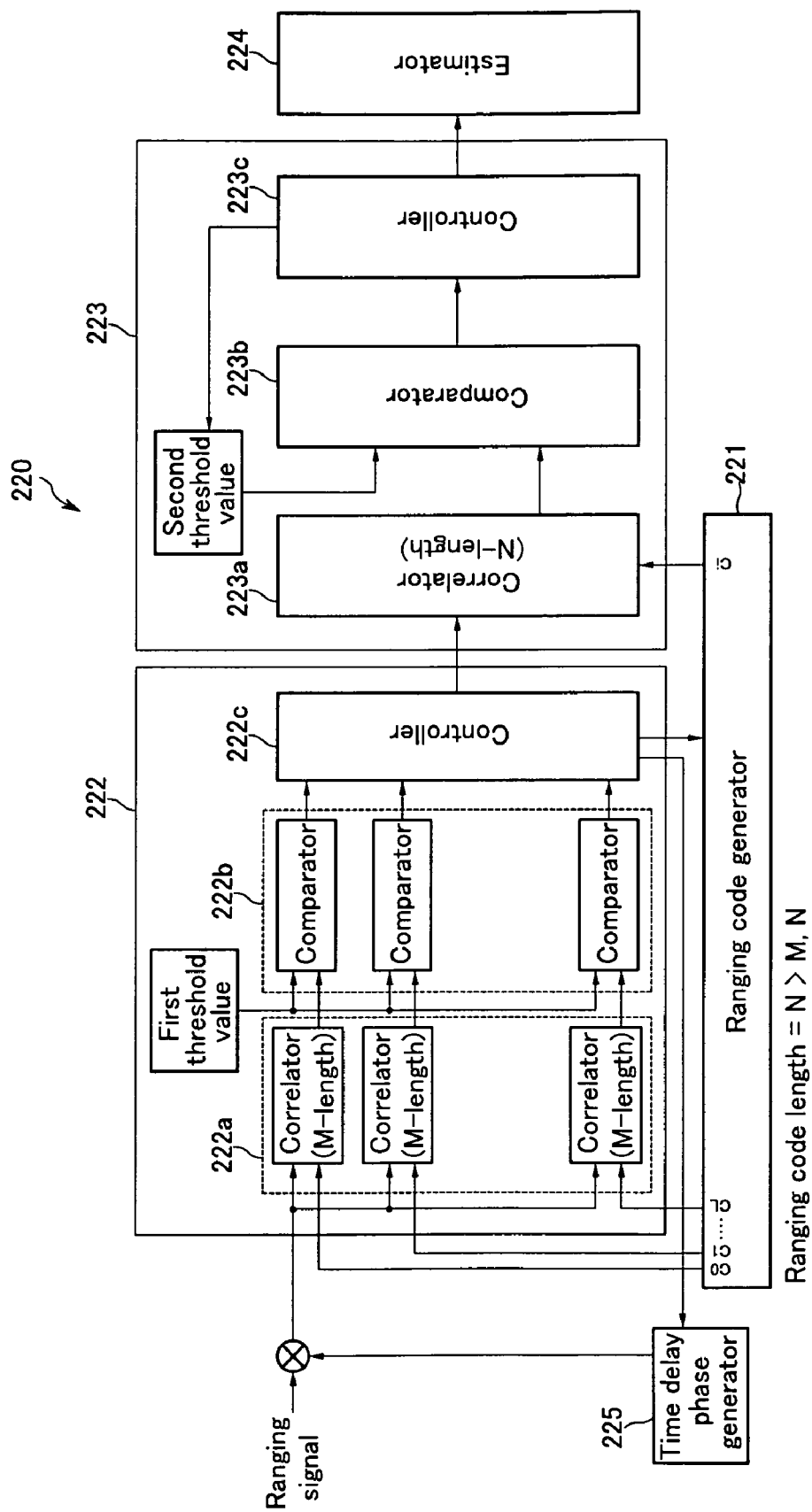
FIG. 2 shows a ranging channel signal processor of FIG. 1 in further detail.

The ranging channel processing apparatus 200 will be described in further detail with reference to FIG. 2, which shows the ranging channel signal processor 220 of FIG. 1 in further detail. As shown in FIG. 2, the first ranging signal selector 222 includes a plurality of correlators 222a, a plurality of comparators 222b, and a controller 222c, and the second ranging signal selector 223 includes a correlator 223a, a comparator 223b, and a controller 223c. The plurality of correlators 222a respectively correspond to the plurality of ranging codes generated by the ranging code generator 221, and the plurality of comparators 222b respectively correspond to the plurality of correlators 222a.

In the first ranging signal selector 222, the respective correlators 222a receive a ranging channel signal according to a time delay extracted by the ranging channel signal extractor 210 and a corresponding ranging code generated by the ranging code generator 221, and performs an M-length partial correlation on the ranging channel signal and the ranging code. The M-length is shorter than the N-length ranging code.

The respective comparators 222b receive correlation values from the respective correlators 222a and compare the received correlation values with a first threshold value. Based on the comparison result of the comparator 222b, the controller 222c outputs a ranging channel signal having a correlation value greater than the first threshold value to the correlator 223a of the second ranging signal selector 223. In addition, the controllers 222c transmit a ranging code and a time delay that correspond to the ranging channel signal having the correlation value greater than the first threshold to the ranging code generator 221, and controls the time delay phase generator 224 to generate a phase for the time delay. The first ranging signal selector 222 performs the above process on overall time delays that can be searched by the base station.

In the second ranging signal selector 223, the correlator 223a performs ranging code length (N-length) correlation on each of the ranging channel signals output from the controller 222c with a corresponding ranging code. The comparator 223b compares a correlation value output from the correlator 223a with a second threshold value. According to the comparison result of the comparator 223b, the controller 223c updates a second threshold value of the corresponding ranging code with a correlation value output from the correlator 223a when the correlation value is greater than the second threshold value. In addition, the second ranging signal selector 223 repeats the above process on ranging channel signals output from the controller 222c, the ranging channel signals being respectively according to time delays. Repetition of the above process on the time delays that can be searched by the base station provides a ranging channel signal that corresponds to the maximum value among updated second threshold values of corresponding ranging codes that can be selected.

Figure 3:
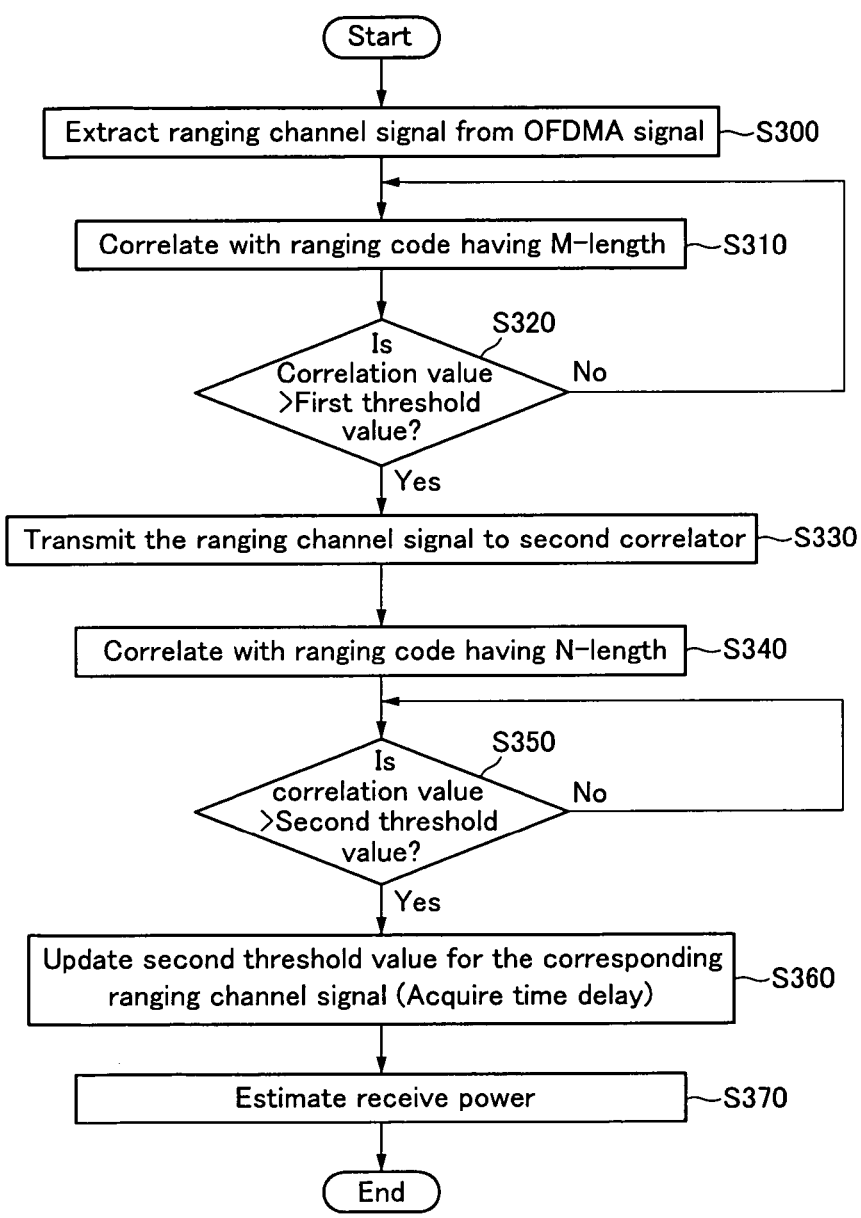
FIG. 3 is an operational flowchart of an operational process of the ranging channel processing apparatus according to the exemplary embodiment of the present invention.

The estimator 224 estimates receiving power of the ranging channel signal selected by the controller 223c by using a time delay of the ranging channel signal. FIG. 3 is an operational flowchart of the ranging channel processing apparatus according to the exemplary embodiment of the present invention. As shown in FIG. 3, the ranging channel signal extractor 210 extracts a ranging channel signal from a received signal, in step S300.

The controller 222c controls the time delay phase generator 225, and accordingly, the ranging channel signal extracted by the ranging channel signal extractor 210 is multiplied by a phase of a time delay, and a result of the multiplication is input to the plurality of correlators 222a. At this time, the plurality of correlators 222a respectively receive a ranging code according to a ranging mode used in the base station.

The plurality of correlators 222a perform M-length partial correlation on the input ranging channel signal with each of the ranging codes generated by the ranging code generator 221, and transmits the correlation results to the respective comparators 222b, in step S310.

Comparators 222b compare the correlation values transmitted from the respective correlators 222a with the first threshold value, in step S320.

Based on the comparison result, the controller 222c transmits a ranging channel signal having a correlation value greater than the first threshold value to the correlator 223a in step S330, and transmits a time delay and a ranging code for the ranging channel signal to the ranging code generator 221. Then, the controller 222c determines whether the base station has terminated searching for all the possible time delays, and controls the time delay phase generator 225 to output a phase for a new time delay when the base state has not yet terminated the search. Until the base station terminates the search for all the possible time delays, steps S310 and S320 are repeated.

When receiving the ranging channel signal from the controller 222c, the correlator 223a performs an N-length correlation on the ranging channel signal with a ranging code corresponding to the ranging channel signal, and transmits a correlation result to the comparator 223b, in step S340.

The comparator 223b compares the correlation value transmitted from the correlator 223a with the second threshold value, in step S350.

The controller 223c updates the second threshold value with a correlation value output from the correlator 223a, the correlation value being greater than the second threshold value, in step S360.

Until the base station terminates searching for all the possible time delays, the steps S340 to S360 are repeated on ranging channel signals sequentially received from the controller 222c. A ranging channel signal having the maximum updated second threshold value among updated second threshold values of the corresponding ranging codes is selected from the result of the repetition of the steps S340 to S360, and receiving power is estimated using a time delay of the ranging channel signal, in step S370. Then, the ranging channel signal processing process is terminated.

As described, according to the exemplary embodiment of the present invention, rather than arranging the ranging code length (N-length) correlators in parallel, the M-length correlators of the first ranging signal selector 222 are arranged in parallel so as to primarily select ranging channel signals for all the possible time delays that can be searched by the base station. Herein, the M-length is shorter than the N-length. After than, the second ranging signal selector 223 selects a ranging channel signal using the correlator performing one ranging code length correlation on the primarily selected ranging channel signal such that a time delay and receiving power of the ranging channel signal can be efficiently and promptly measured.

With the above described configuration, a time delay and receiving signal power can be efficiently and promptly acquired from a ranging channel signal greater than a threshold value by using a ranging channel of the OFDMA system. In addition, a first ranging channel signal is selected by using M-length correlator rather than using N-length ranging code correlators arranged in parallel, and a second ranging channel signal is selected from the first ranging channel signal using one ranging code length correlator such that a hardware structure for the ranging channel signal selection process can be simply realized.

The above-described invention may be realized by an apparatus and a method, but may also be realized by a program that realizes functions corresponding to configurations of the exemplary embodiments or a recording medium that records the program.

Although the embodiments of the present invention have been disclosed for illustrative purposes, those skilled in the art will appreciate that various modifications, additions and substitutions are possible, without departing from the scope of

What is claimed is:

1. An apparatus for processing a ranging channel signal from a signal received by a base station in a communication system, the apparatus comprising:
    a ranging code generator for generating a plurality of ranging codes according to ranging modes;
    a ranging channel signal extractor for extracting at least one first ranging channel signal from the received signal;
    a first selector for partially correlating each of a plurality of second ranging channel signals with the ranging codes to select at least one second ranging channel signal, the at least one second ranging channel signal having a first correlation value that is greater than a first threshold value, the plurality of second ranging channel signals being signals corresponding to a plurality of time delays of the at least one first ranging signal;
    a second selector for correlating the at least one second ranging channel signal selected by the first selector with a corresponding ranging code to select a second ranging channel signal having a maximum correlation value; and
    an estimator for estimating receiving power using a time delay of the at least one second ranging channel signal selected by the second selector,
    wherein the first selector performs partial correlation of a shorter length than each of the ranging codes.

2. The apparatus of claim 1, wherein the plurality of time delays include all time delays that can be searched by the base station.

3. The apparatus of claim 1, further comprising a time delay phase generator for sequentially generating phases corresponding to the plurality of time delays.

4. The apparatus of claim 1, wherein the first selector comprises:
    a plurality of first correlators respectively corresponding to the plurality of ranging codes, and partially correlating the corresponding ranging codes with the plurality of second ranging channel signals;
    a plurality of first comparators respectively corresponding to the plurality of first correlators, and comparing partial-correlation values of the first correlators with the first threshold value; and
    a first controller for transmitting a ranging code corresponding to a partial-correlation value that is greater than the first threshold value among a plurality of partial-correlation values of the plurality of first correlators and time delay information to the ranging code generator, and outputting a second ranging channel signal greater than the first threshold value.

5. The apparatus of claim 4, wherein the second selector comprises:
    a second correlator for correlating the at least one second ranging channel signal with a corresponding ranging code;
    a second comparator for comparing at least one correlation value of the second correlator and a second threshold value; and
    a second controller for updating the second threshold value of the corresponding ranging code with a second correlation value that is greater than the second threshold value among the at least one correlation value, and transmitting a second channel signal that corresponds to the maximum value among the updated second threshold values to the estimator.

6. The apparatus of claim 5, wherein the second correlator performs correlation of which length corresponds to each ranging code length.

7. The apparatus of claim 1, wherein the estimator estimates receiving power by using a time delay of the second ranging channel signal that corresponds to the maximum second threshold value.

8. A method for processing a ranging channel signal from a signal received by a base station in a communication system, the method comprising:
    extracting a first ranging channel signal from the received signal;
    partially correlating each of a plurality of second ranging channel signals with each of ranging codes according to a ranging mode to select a second ranging channel signal having a correlation value that is greater than a first threshold value, the plurality of second ranging channel signals being signals corresponding to a plurality of time delays of the first ranging channel signal;
    correlating each selected second ranging channel signal and each of corresponding ranging code to select a second ranging channel signal having a maximum correlation value as a third ranging channel signal; and
    estimating receiving power using a time delay corresponding to the third ranging channel signal,
    wherein partially correlating each of the plurality of second ranging channel signals includes performing partial correlation of a shorter length than each of the ranging codes.

9. The method of claim 8, wherein the selection of the third ranging channel signal includes:
    sequentially correlating each selected second channel signal and each of the corresponding ranging code;
    updating a second threshold value for the corresponding ranging code with a correlation value that is greater than the second threshold value; and
    acquiring a time delay of a second ranging channel signal corresponding to the maximum value from among the updated second threshold values.

10. The method of claim 8, wherein the selection of the second ranging channel signal comprises:
    partially correlating a second ranging channel signal with a ranging code according to the ranging mode, the second ranging channel signal corresponding to one of the plurality of time delays;
    comparing the partial correlation value with the first threshold value;
    repeating the partial correlation, the comparison, and the selection for the plurality of time delays.

11. An apparatus for processing a ranging channel signal received by a base station in a communication system, the apparatus comprising:
    means for generating a plurality of ranging codes according to a ranging mode;
    means for selecting at least one second ranging channel signal from a plurality of first ranging channel signals using the plurality of ranging codes, the plurality of first ranging channel signals being signals corresponding to a plurality of time delays;
    means for selecting a third ranging channel signal from the at least one second ranging channel signal using a ranging code corresponding to the at least one second ranging channel signal among the plurality of ranging codes; and
    means for estimating receiving power using a time delay of the third ranging channel signal, wherein the means for selecting the at least one second ranging channel signal comprises:

means for partially correlating each of the first ranging channel signals and each of the ranging codes;

means for comparing a plurality of correlation values output from the partial correlation with a threshold value; and means for outputting a first ranging channel signal corresponding to a correlation value that is greater than the threshold value from among the plurality of first ranging channel signals as the at least one second ranging channel signal, and wherein the means for selecting the third ranging channel signal comprises:

means for correlating the at least one second ranging channel signal and a corresponding ranging code;

means for updating the threshold value by comparing at least one correlation value according to the correlation with the threshold value; and means for estimating the receiving power using a time delay of a second ranging channel signal that corresponds to the maximum threshold value from among the updated threshold values, wherein a length of the partial correlation is shorter than each ranging code length.

12. The apparatus of claim 11, wherein the plurality of time delays include all time delays that can be searched by the base station.

13. The apparatus of claim 11, wherein a length of the correlation equals a length of the corresponding ranging code.

* * * * *